(12) United States Patent
Pringnitz

(10) Patent No.: US 10,548,309 B2
(45) Date of Patent: Feb. 4, 2020

(54) ANIMAL GAME CALL

(71) Applicant: Tree Thrasher, LLC, Mount Pleasant, IA (US)

(72) Inventor: Todd Pringnitz, Mount Pleasant, IA (US)

(73) Assignee: Tree Thrasher, LLC, Mount Pleasant, IA (US)

( * ) Notice: Subject to any disclaimer, the term of this patent is extended or adjusted under 35 U.S.C. 154(b) by 0 days.

(21) Appl. No.: 16/109,236

(22) Filed: Aug. 22, 2018

(65) Prior Publication Data

US 2019/0110463 A1    Apr. 18, 2019

Related U.S. Application Data

(60) Provisional application No. 62/572,075, filed on Oct. 13, 2017.

(51) Int. Cl.
*A63H 5/00* (2006.01)
*A01M 31/00* (2006.01)

(52) U.S. Cl.
CPC ................ *A01M 31/004* (2013.01)

(58) Field of Classification Search
CPC .......... A63H 5/00; A63H 33/00; A63H 33/40; A01M 31/004; G10K 5/00; G10K 11/004
USPC .... 446/206–208; 84/363, 364, 384 A, 383 R
See application file for complete search history.

(56) References Cited

U.S. PATENT DOCUMENTS

| | | | | |
|---|---|---|---|---|
| 4,335,539 A * | 6/1982 | Jones | ................. | A63H 5/00 446/204 |
| 5,873,766 A * | 2/1999 | Burton | ................. | A63H 5/00 446/419 |
| 5,975,978 A * | 11/1999 | Hall | ................. | A01M 31/004 446/208 |
| 7,083,492 B1 * | 8/2006 | Morocco | ................. | A01M 31/004 446/202 |
| 8,469,756 B2 * | 6/2013 | Becker | ................. | B63B 35/7916 114/352 |

* cited by examiner

*Primary Examiner* — Kien T Nguyen
(74) *Attorney, Agent, or Firm* — Price Heneveld LLP

(57) ABSTRACT

A game call capable of providing a variety of sounds produced by wild game is provided. The game call includes a first end cap, a second end cap, and a collapsible member coupled to the first end cap and the second end cap wherein the collapsible member can be extended and retracted to simulate a rustling foliage sound. The game call may also include a clip member coupled to the first end cap wherein the clip member may be configured to simulate a branch breaking sound. The game call may still additionally include one or more knob members coupled to the first end cap and/or the second end cap where the one or more knob members may be configured to be scraped against a surface to simulate an antler rubbing sound.

20 Claims, 9 Drawing Sheets

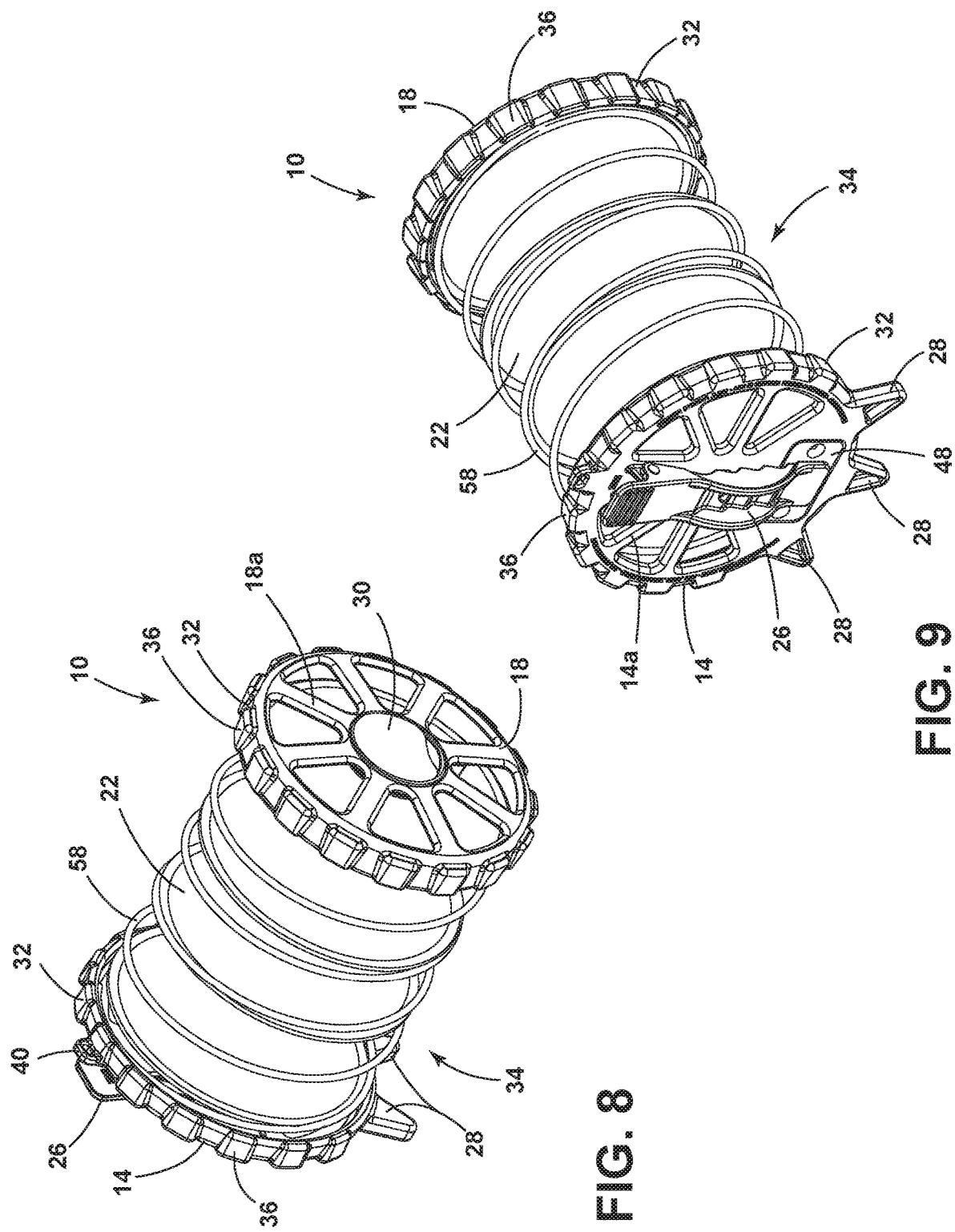

ANIMAL GAME CALL

CROSS-REFERENCE TO RELATED APPLICATIONS

This patent application claims priority under 35 U.S.C. § 119(e) to U.S. Provisional Patent Application No. 62/572,075, entitled "POCKET TREE THRASHER CALL," filed Oct. 13, 2017, the entire disclosure of which is incorporated herein by reference.

FIELD OF THE INVENTION

The present invention generally relates to a device and method for calling game, and more particularly to a device that emulates a variety of sounds produced by many types of wild game.

BACKGROUND OF THE INVENTION

Hunters typically employ a variety of different devices and methods for calling wild game into range to be shot by a rifle, bow, or other weapon. Typically, the sounds produced by these calls use a reed, or other type of vibration device, placed within a longitudinal passage. The hunter then forces air from the hunter's lungs through the passage to vibrate the reed or sound making device to produce a tone emulating a moose, elk, deer, water fowl, or wild turkey.

While many of the currently available game calls are capable of producing a number of different animal sounds, none of the known, currently available calls provide non-animal alternative sounds or methods of calling in wild game. Accordingly, a wildlife or game call that can offer new options and/or techniques to overcome the deficiencies of the game calls available on the market may improve the experience for hunters and wildlife enthusiasts alike.

BRIEF SUMMARY OF THE INVENTION

According to one aspect of the present invention, a game call is provided. The game call includes a first end cap; a second end cap; a collapsible member coupled to the first end cap and the second end cap wherein the collapsible member can be extended and retracted to simulate a rustling foliage sound; a clip member coupled to the first end cap wherein the clip member is configured to simulate a branch breaking sound; and one or more knob members coupled to the first end cap, the second end cap, or a combination thereof wherein the one or more knob members are configured to be scraped against a tree to simulate an antler rubbing sound.

According to another aspect of the present invention, a game call is provided. The game call includes a first end cap; a second end cap; and a collapsible member coupling the first end cap to the second end cap wherein the collapsible member can be extended and retracted to simulate a rustling foliage sound. In some aspects, the game call may additionally include a clip member coupled to the first end cap wherein the clip member is configured to simulate a branch breaking sound and/or may include one or more knob members coupled to the first end cap, the second end cap, or a combination thereof wherein the one or more knob members are configured to be scraped against a tree to simulate an antler rubbing sound.

According to another aspect of the present invention, a method for calling game is provided. The method includes providing a game call. The game call includes: a first end cap; a second end cap; a collapsible member coupling the first end cap to the second end cap wherein the collapsible member can be extended and retracted to simulate a rustling foliage sound; a clip member coupled to the first end cap wherein the clip member is configured to simulate a branch breaking sound; and one or more knob members coupled to the first end cap, the second end cap, or a combination thereof wherein the one or more knob members are configured to be scraped against a surface to simulate an antler rubbing sound. The method further includes calling the game with the game call by extending and/or retracting the collapsible member using the first and second end caps to simulate a rustling foliage sound; calling the game with the game call by snapping the clip member to simulate a branch breaking sound; calling the game with the game call by rubbing the one or more knob members against a tree or a surface to simulate an antler rubbing sound; and/or calling the game with the game call by retracting the first and second end caps together against each other to simulate a hoof stomping sound.

These and other features, advantages, and objects of the present invention will be further understood and appreciated by those skilled in the art by reference to the following specification, claims, and appended drawings.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

FIG. 8 is a front perspective view of a game call in an open position according to some aspects of the present disclosure;

FIG. 9 is a rear perspective view of a game call in the open position provided in FIG. 8 according to some aspects of the present disclosure.

DETAILED DESCRIPTION

Figure 1:
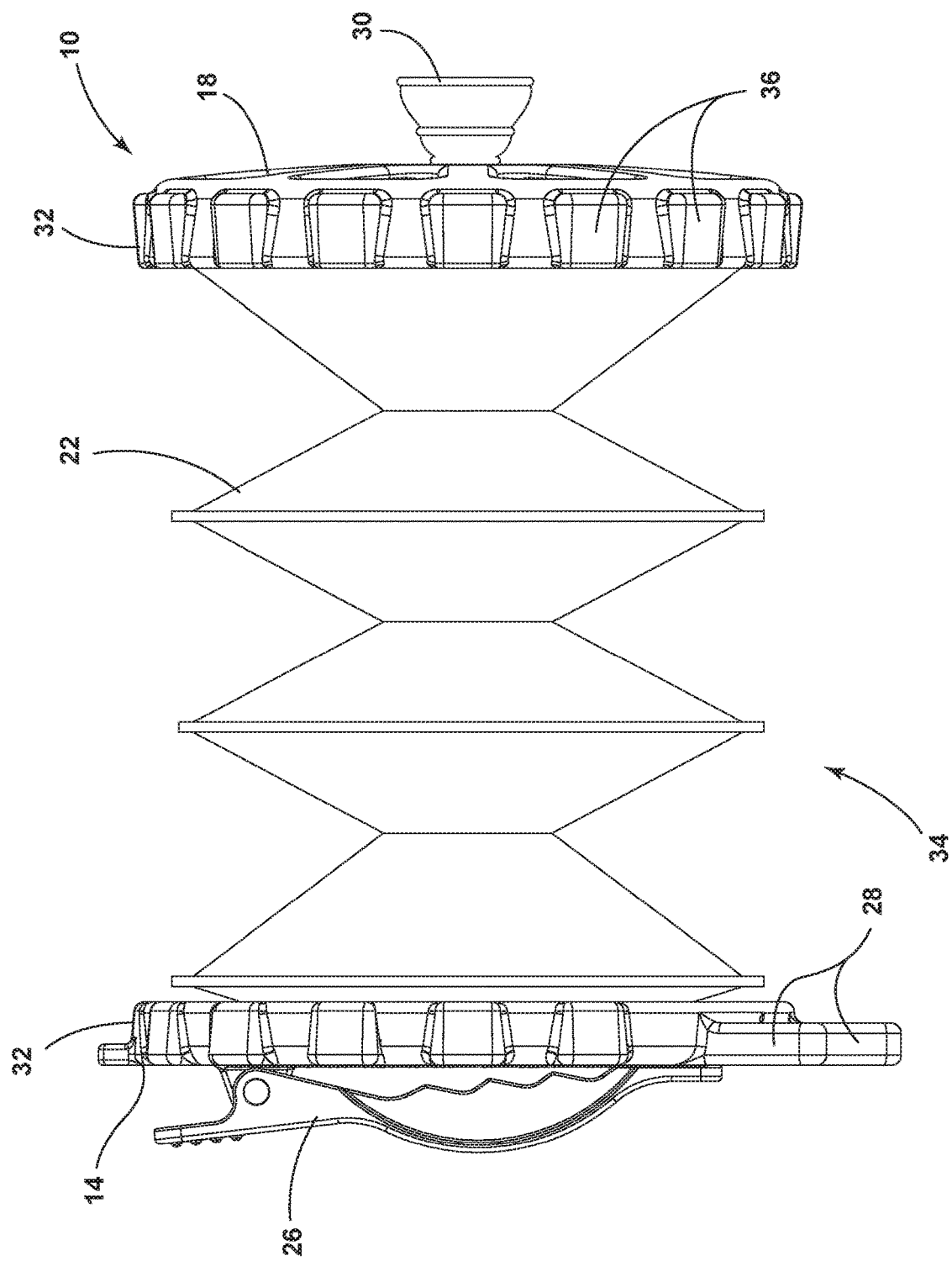
FIG. 1 is a side view of a game call according to some aspects of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-9, reference numeral 10 generally designates a game call. The game call 10 may include a first end cap 14; a second end cap 18; a collapsible member 22 coupled to the first end cap 14 and the second end cap 18 wherein the collapsible member 22 can be extended and retracted to simulate a rustling foliage sound. The game call 10 may also include a clip member 26 coupled to the first end cap 14 wherein the clip member may be configured to simulate a branch breaking sound. The game call 10 may still additionally include one or more knob members 28 coupled to the first end cap 14, the second end cap 18, or a combination thereof (e.g., the first and second end caps 14, 18) where the one or more knob members 28 may be configured to be scraped against a surface to simulate an antler rubbing sound.

In some aspects, the game call 10 may be used to provide several different calls or sounds that represent different noises animals make in the wild. While known available calls principally focus on making grunting, bleating, or rattling antler sounds, the game call 10 may simulate a leaf-like noise, a thrashing sound, a rustling foliage sound, a branch breaking sound, an antler rubbing sound, a foot stomping sound, a shaking tree sound, a shaking bush sound, or a combination thereof. In some aspects, the game call 10 does not make any grunting, bleating, or other additional sounds made by the vocal system of the wild game or animal itself. The game call 10 may be used to call in, attract, distract, lure, or bait in a variety of large and small game including, but not limited to, moose, elk, deer, mule deer, water fowl, wild turkey, sheep, or any combination thereof. In some aspects, the game call 10 may be used to provide a four-in-one call providing: 1) a thrashing/rustling foilage sound; 2) a branch breaking sound; 3) an antler rubbing sound; and 4) a foot stomping sound. In other aspects, the game call 10 may be used to provide a three-in-one call providing: 1) a thrashing/rustling foilage sound; 2) a branch breaking sound; and 3) an antler rubbing sound. In still other aspects, the game call 10 may be used to provide a two-in-one call providing: 1) a thrashing/rustling foilage sound and a branch breaking sound or a thrashing/rustling foilage sound and an antler rubbing sound.

Referring to FIG. 1, a side view of the game call 10 is provided according to some aspects of the present disclosure. The game call 10 includes the first end cap 14 coupled to the collapsible member 22 wherein the collapsible member 22 is additionally coupled to the second end cap 18. The game call 10 as illustrated in FIG. 1 is in an open or extended position 34 so that the collapsible member 22 also is in a partially or fully extended position. In some aspects, the clip member 26 may be coupled to the first end cap 14 while the grip member 30 can be coupled to the second end cap 18. In some aspects, both the first and second end caps 14, 18 may include a rim portion 32 that runs along the perimeter of the first and second end caps 14, 18 to form an additional side or lip portion circumventing the edge. In some aspects, the first and end caps 14, 18 may each include no rim portion 32 and the first and second end caps 14, 18 may alternatively be called first and second end members, respectively. In some aspects, the rim portion 32 of the first and/or second end caps 14, 18 may include a plurality of gripping members 36 positioned around the circumference of the rim portions 32 to better enable a user to grip the first and/or second end caps 14, 18. The user attempting to simulate a rustling foliage sound may extend and retract the collapsible member 22 as many times as desired to continue making the respective sound.

The first and second end caps 14, 18 may be made from a variety of materials including, for example, plastic, rubber, thermoplastic, thermoset, wood, glass, or any combination thereof. The diameter of the first and second end caps 14, 18 may be less than 15 cm, less than 10 cm, less than 9 cm, less than 8 cm, less than 7 cm, less than 6 cm, or less than 5 cm. In some aspects, the first and second end caps 14, 18 comprise a plastic material. In other aspects, the first and second end caps 14, 18 comprise a rubber material. The material selected for the first and second end caps 14, 18 may be chosen based on its ability to simulate a hoof striking a leaf-covered surface or stomping noise when the first and second end caps 14, 18 are hit together.

The collapsible member 22 is designed to simulate a thrashing and/or rustling foliage sound. This thrashing and/or rustling foliage sound is meant to replicate the sound of leaves, a tree, a branch, a sapling, a bush, undergrowth, or a combination thereof being shaken or brushed against. The speed and forcefulness of retracting and extending the collapsible member can change the intensity and/or volume of the thrashing and/or rustling foliage sound as desired by the user. The collapsible member 22 is fabricated from "a noisy cloth" that comprises a noisy material or a fabric made from cotton, natural fibers, nylon, polyester, plastic, or a combination thereof that makes a crinkling sound that simulates the sound of thrashing and/or rustling foliage. In some aspects, the collapsible member 22 may have a cloth cover (e.g. cotton, polyester, nylon, silk, denim, chambray, flannel) and a noisy plastic interior (e.g. polyethylene, polypropylene, polyester, polyether, thermoplastics, thermosets, or other noisy material) to form a combined material that crinkles and makes a thrashing and/or rustling foliage or rustling leaves sound.

In some aspects, the structure of the collapsible member 22 may have an accordion design, a fan design, a crumpled or wadded design, or a combination thereof. In some aspects, the noisy collapsible member 22 may have an accordion design. The accordion design provides the benefit of folding down upon itself to take up less space and make the simulated thrashing and/or rustling foliage sounds more consistently.

The clip member 26 may be designed to provide multiple uses including: simulating a branch breaking sound by snapping the clip member 26 against a surface of the first end cap 14; attaching the game call 10 to the user or another desired surface; and/or providing an ergonomic gripping interface. In some aspects, the clip member 26 may include, for example, a belt clip, a pin, a clip, a carabiner, a bolt, a swivel hook, a hook, a clasp, or any combination thereof. In some aspects, the clip member 26 may be coupled to the first end cap 14 by using, for example, glue, weld, mold, screws, or snapping fixtures to fix or position the clip member 26 in the center or anywhere else on the surface of the first end cap 14. In some aspects, the clip member 26 may be used as a belt clip.

In some aspects, the grip member 30 may be coupled to the second end cap 18 and may be both retractable and extendable to make the game call 10 more compact when not in use and more easily operated when in use. In some aspects, the grip member 30 is an extended handle. In other aspects, the grip member 30 is a collapsible handle that can retract to a flat position to lay substantially even with the second end cap 18. In still other aspects, the grip member 30 may be a pop socket handle coupled to the center or other surface of the second end cap 18 as further explained below in FIG. 2. In still additional aspects, the game call 10 may not include the grip member 30 or any additional handle on the outer surface of the second end cap 18 where instead the user may open and close the game call 10 by gripping the rim portion 32 and the corresponding gripping members 36.

Figure 2:
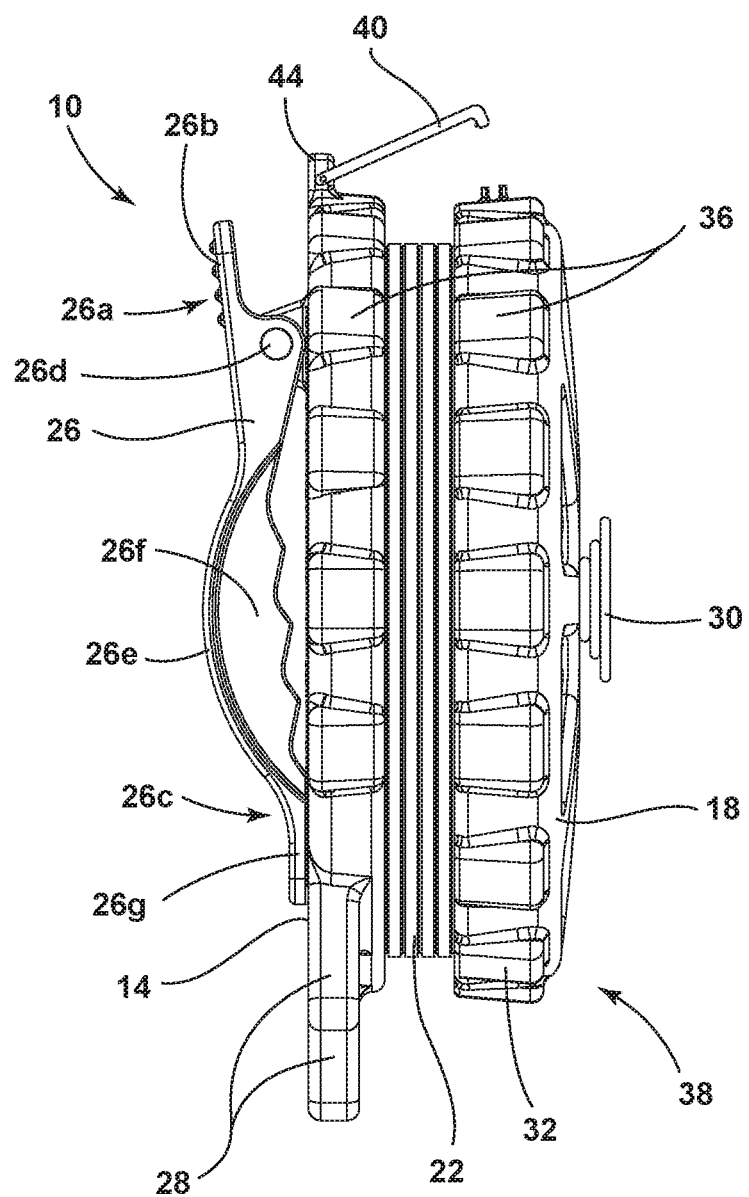
FIG. 2 is a side view of a game call in a collapsed position according to some aspects of the present disclosure.

Referring now to FIG. 2, the game call 10 is provided in a retracted, closed, or compressed position 38. In the retracted position, the collapsible member 22 is retracted or collapsed between the first and second end caps 14, 18. In some aspects, the collapsible member 22 and spring 58 (see FIG. 6) may be completely enclosed by the first and second end caps 14, 18 when in the closed position 38. In addition, in some aspects the grip member 30 may additionally contract or be folded down to form a more even surface on the second end cap 18. In some aspects, the collapsible member 22 may automatically retract into the compressed position and pull the second end cap 18 towards the first end cap 14 as shown in FIG. 2. In some aspects, the one or more grip members 30 are positioned along a bottom edge of the rim portion 32 of the first end cap 14.

Still referring to FIG. 2, the clip member 26 as illustrated may be used to simulate a branch breaking sound by snapping the clip member 26 against a surface of the first end cap 14, attaching the game call 10 to the user or another desired surface, and providing an ergonomic gripping interface. In some aspects, the clip member 26 may include a first end 26a having a textured push flap 26b used to rotate a second end 26c of the clip member 26 using, for example, a pivot point 26d having a spring loaded mechanism (not shown). To provide the ergonomic gripping interface, the clip member 26 may additionally include at least one lip portion 26e supported and cut in half lengthwise with a center wall member 26f where the center wall member 26f runs lengthwise with the clip member 26 provided the user with lip portions 26e running along each side edge of the clip member 26. The second end 26c of the clip member 26 ends with a snapping flap 26g that slaps against or strikes an insert member 48 (see FIG. 9) or the surface of the first end cap 14. In some aspects, the strength and/or position of the clip member's 26 snap may be adjusted to control the strength and sound of the snap. In other aspects, the size, dimensions, and corresponding thickness of the clip member 26 may be adjusted to control the strength and sound of the snap. Depending on the design and desired applications of the game call 10, the snapping sound may be adjusted by changing the insert member 48 and/or the strength of the spring mechanism implemented. In some aspects, the clip member 26 may be made from a variety of different materials, for example, wood, metal, plastic, thermoplastic resin, thermoset resin, rubber, ceramic, glass, rock, or a combination thereof. In some aspects, the clip member 26 may be made from a hard plastic material having a Shore D hardness of at least 10, at least 20, at least 30, at least 40, at least 50, at least 60, at least 70, at least 80, or at least 90 as measured using a hardened steel rod (1.1 mm-1.4 mm diameter) with a 30° conical point, a 0.1 mm radius tip with a 4.550 kg applied mass and a 44.64 N resulting force.

Still referring to FIG. 2, an attachment member 40 may be used to couple the first end cap 14 to the second end cap 18 when the game call 10 is not in use. Although the collapsible member 22 may provide enough force to retract the first and second end caps 14, 18 together into the closed position 38, the attachment member 40 may be used to lock the first and second end caps 14, 18 together to keep them in the closed position 38. By using the attachment member 40, the first and second end caps 14, 18 or grip member 30 can be prevented from catching on a surface or item in the forest and undesirably opening the game call 10 and actuating the thrashing and/or rustling foliage sound. In some aspects, the attachment member 40 may be coupled to the rim portions 32 of the first and second end caps 14, 18 and may include, for example, a hook and latch, an elastic loop and hook, a magnetic clasp, a string and notch, or a combination thereof. In some aspects, the attachment member 40 may be coupled to a receiving member 44 configured to position, for example, a rope, string, or lanyard. In some aspects, the receiving member 44 may be a rope/string lanyard that does not include the attachment member 40.

Figure 3:
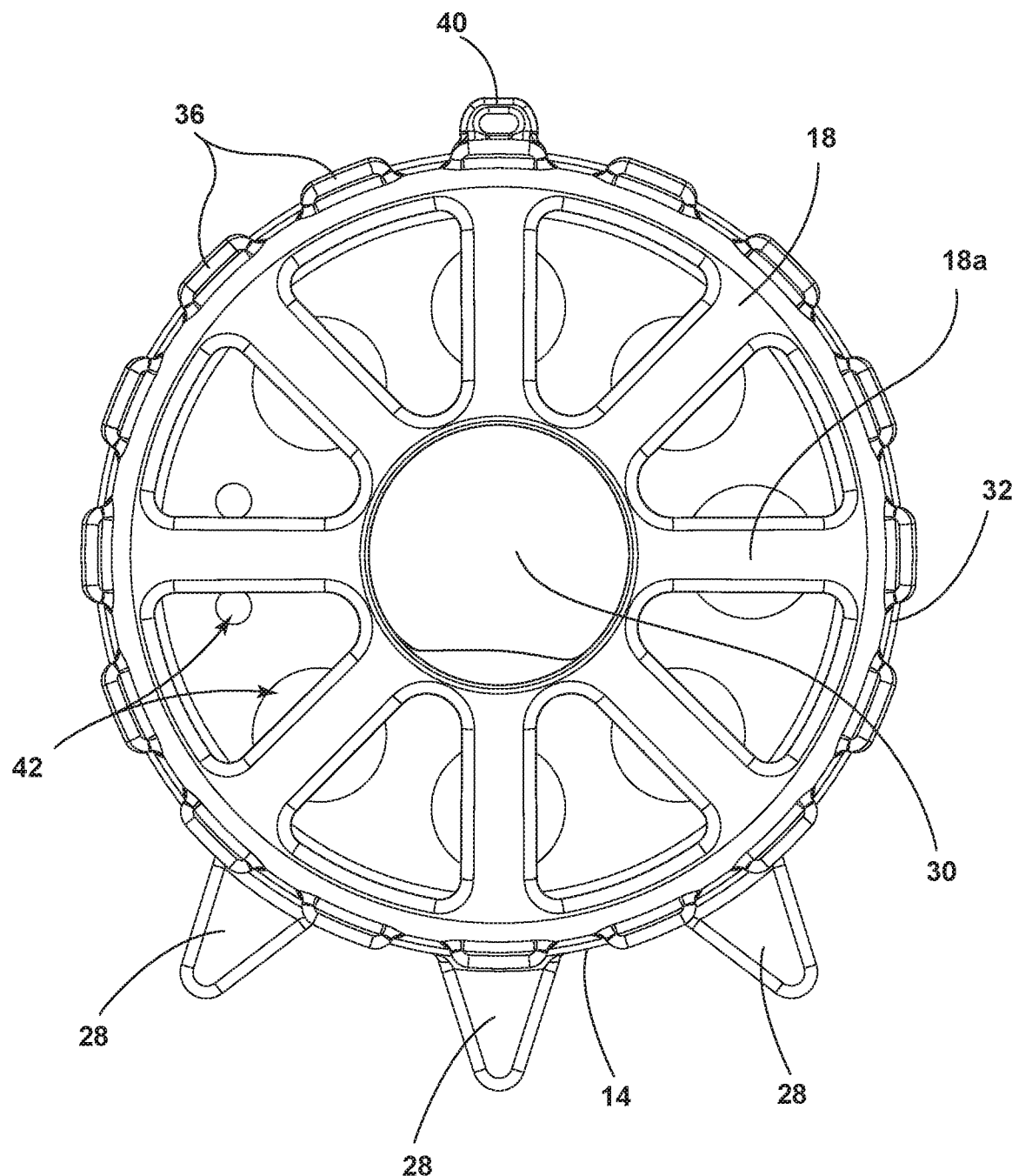
FIG. 3 is a top view of the game call according to some aspects of the present invention.

Referring to FIG. 3, a top view of the second end cap 18 is provided. As shown, the grip member 30 may be coupled to the second end cap 18 in the center or other position on the surface. One or more holes 42, defined by the cap framework 14a, 18a (see FIGS. 8 and 9), may be positioned in the second end cap 18 and/or the first end cap 14, respectively, to permit air flowing in and out of the collapsible member 22 as it is extended and retracted by the user. In some aspects, the holes 42 may be circular, triangular, or any other geometric shape known in the art and the holes 42 used to direct air in and out of the collapsible member 22 may vary in size and shape with respect to the first and second end caps 14, 18. In other aspects, the one or more holes 42 may be positioned in just the first end cap 14 or second end cap 18 to direct the air flowing in and out of the collapsible member. In still other aspects, the first and second end caps 14, 18 may include no holes 42 and the air may enter the collapsible member 22 directly.

Still referring to FIG. 3, in some aspects, the one or more knob members 28 may be positioned along a bottom edge of the rim portion 32 of the first and/or second end cap 14, 18. As illustrated, the one or more knob members 28 are positioned and spaced about the rim portion 32 at 30° increments along the first end cap 14. In some aspects, the one or more knob members 28 may be spaced at 5°, 10°, 15°, 20°, 25°, 30°, 35°, 40°, or 45° to vary the antler rubbing sound made by rubbing the one or more knob members 28 against, for example, a tree, log, stick, branch, shrub, or undergrowth. In some aspects, the one or more knob members 28 may be positioned around the entire circumference of the first and second end caps 14, 18 and/or rim portions 32 of the first and second end caps 14, 18. In some aspects, the one or more knob members 28 may be larger and extend further outward from the first and second end caps 14, 18 than the gripping members 36. In some aspects, the gripping members 36 may be used to simulate an antler rubbing sound as described for the knob members 28. In some aspects, the one or more knob members 28 may be molded and/or made from the same material as the first and/or second end caps 14, 18 while in other aspects the knob members 28 may be made from an alternative material, e.g., plastic, metal, and/or wood.

Figure 4:
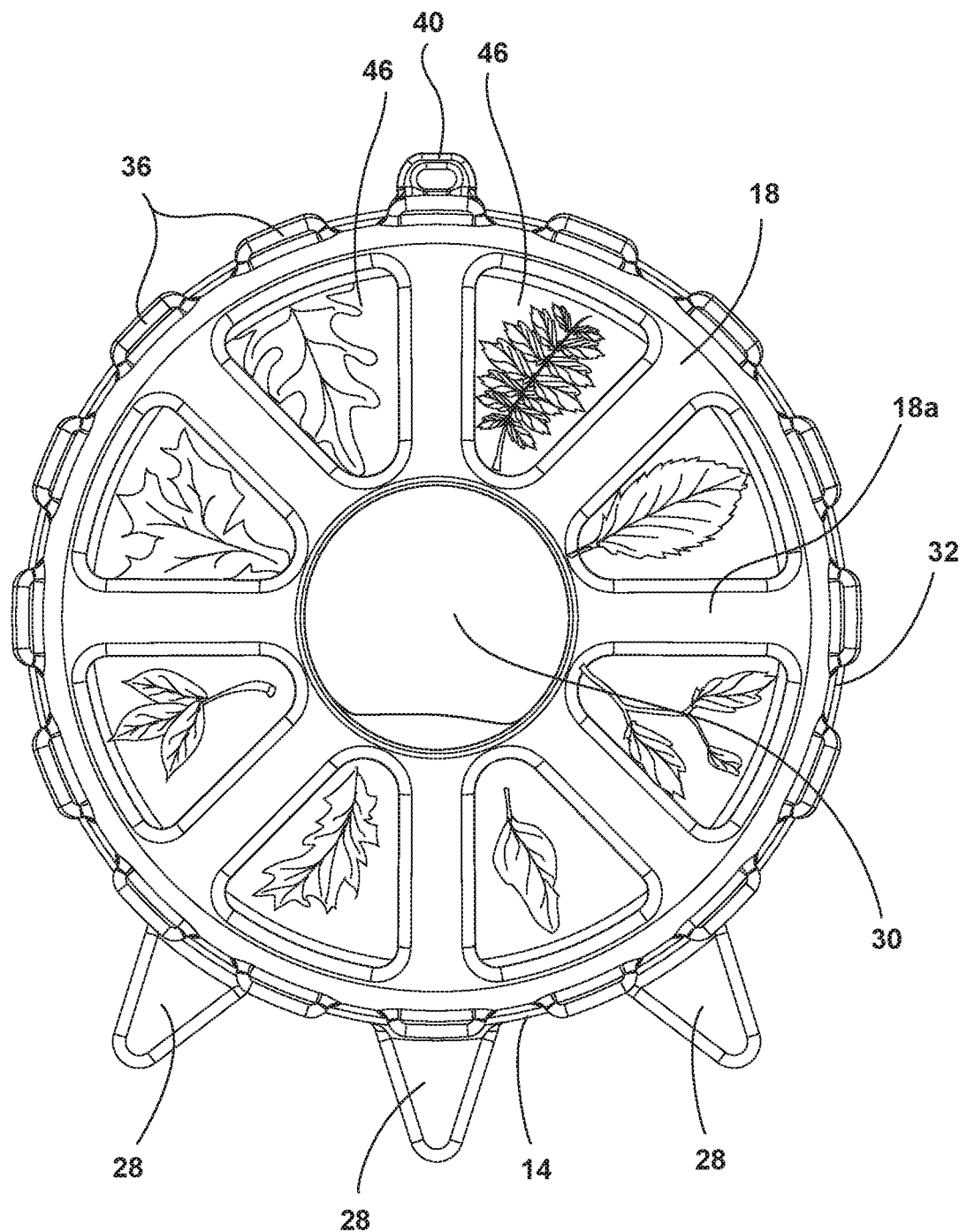
FIG. 4 is a top view of a game call with an incorporated design according to some aspects of the present disclosure.

Referring now to FIG. 4, a top view of the second end cap 18 is shown having a cover layer 46 coupled between the second end cap 18 and the collapsible member 22 according to some aspects of the present disclosure. The cover layer 46 can provide a layer of filtration to prevent dirt and other contaminants from entering into the collapsible member 22 through the holes 42 when it is extended and retracted to simulate the thrashing/rustling foliage sound. In some aspects, the cover layer 46 is positioned between the collapsible member 22 and the first and/or second cap members 14, 18.

Figure 5:
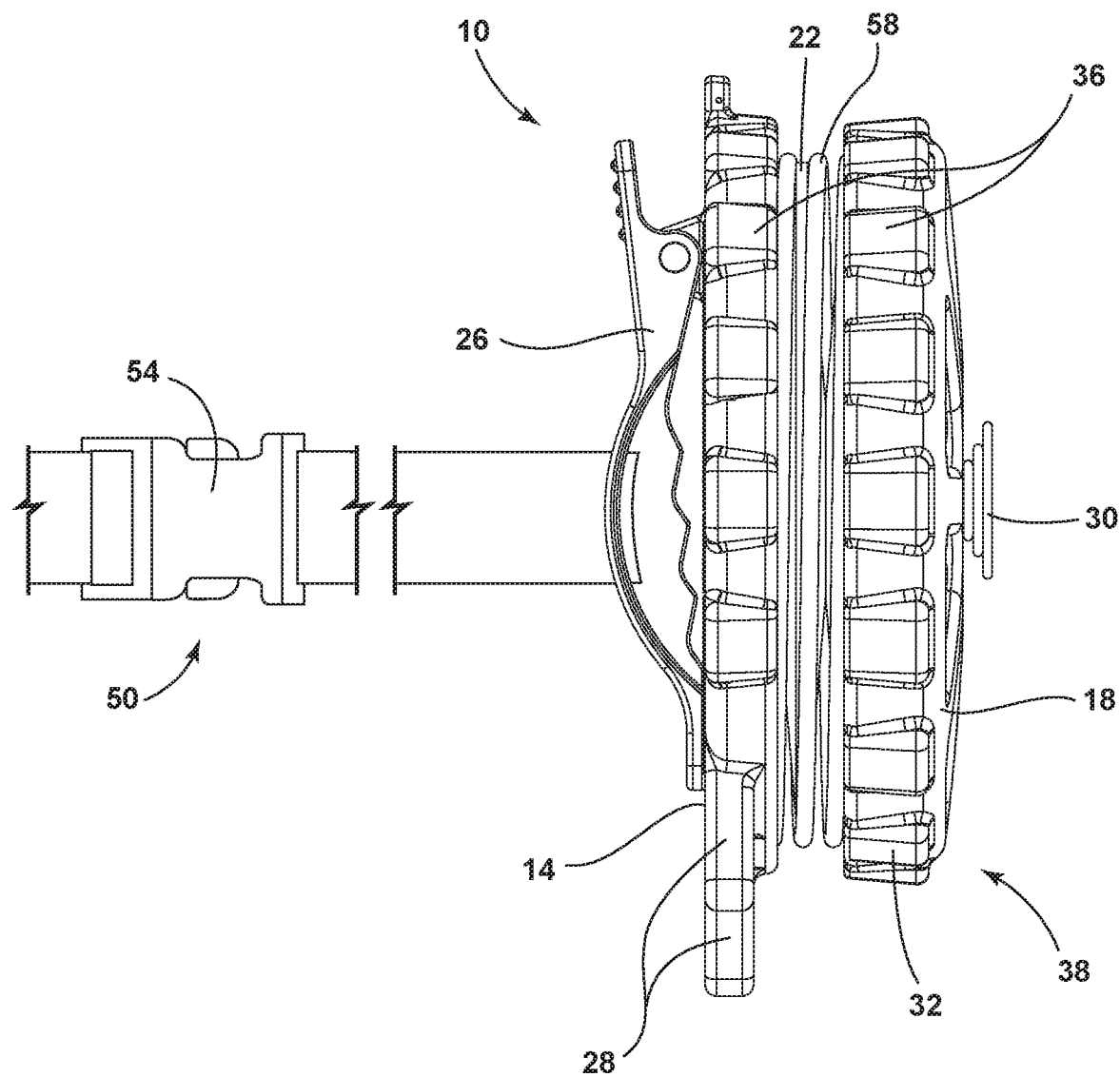
FIG. 5 is a side view of a game call in a collapsed position coupled to a strap according to some aspects of the present disclosure.

Referring now to FIG. 5, the game call 10 is provided in the retracted, closed, or compressed position 38. In the retracted position 38, the collapsible member 22 is retracted or collapsed between the first and second end caps 14, 18. In addition, in some aspects the grip member 30 may additionally contract or be folded down to form a more even surface on the second end cap 18. In some aspects, the collapsible member 22 may automatically retract into the compressed position and pull the second end cap 18 towards the first end cap 14, as shown in FIG. 5. Additionally, provided in some aspects of the invention is a loop strap 50 having a quick release 54. The loop strap 50 may be mounted to the user's body (not shown), for example, an arm, a leg, a waist, or a neck, so that the game call 10 may be easily coupled to the user. In some aspects, the loop strap 50 may have an adjustable length to appropriately fit a variety of different users, body parts, and/or other mounts. In some aspects, the loop strap 50 includes the quick release 54 where the quick release 54 may include a quick release buckle, a fastener, a carabiner, a cleat, or other quick release fasteners known in the art.

Figure 6:
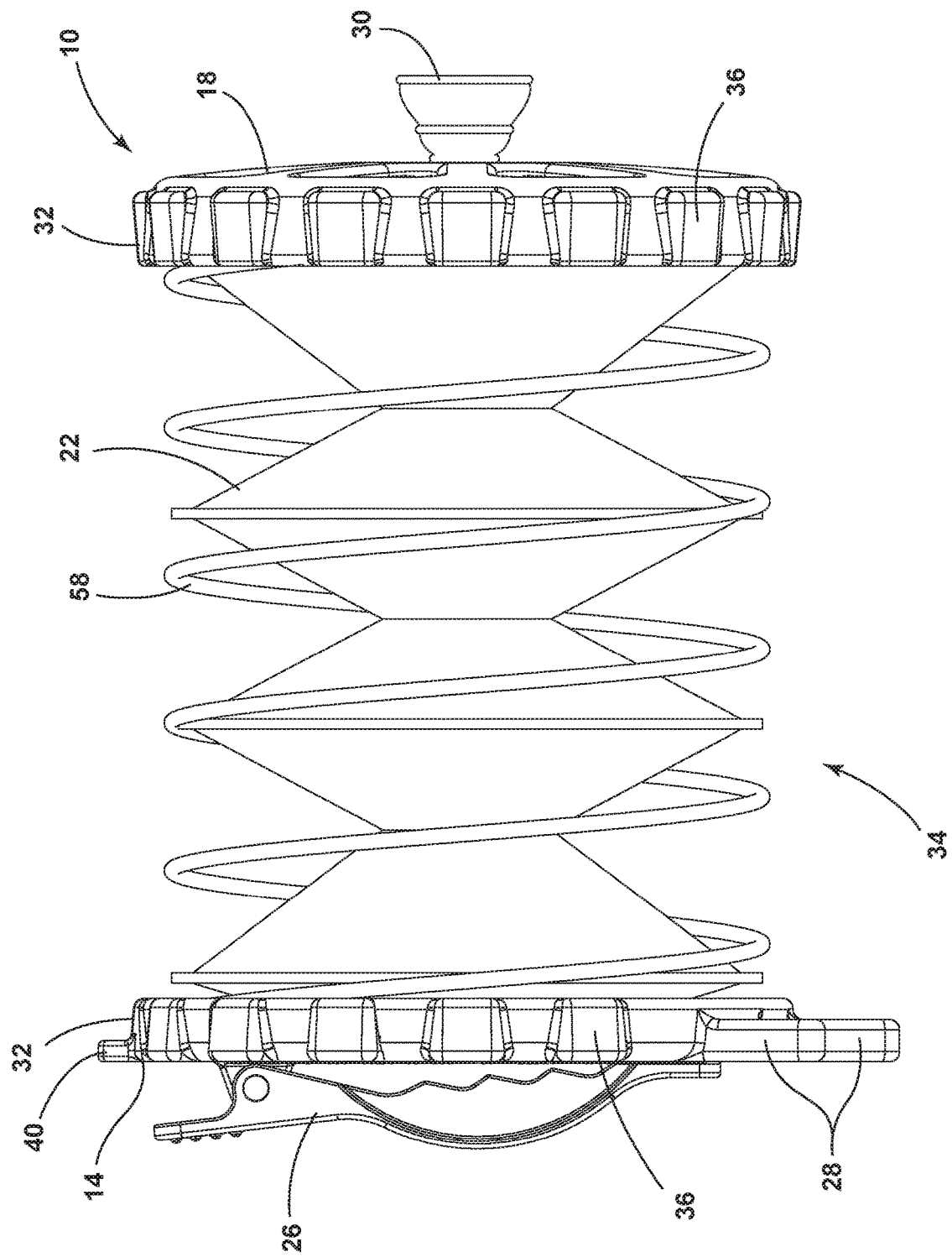
FIG. 6 is a side view of a game call according to some aspects of the present disclosure.

Referring now to FIG. 6, in some aspects the game call 10 may be provided with a spring 58. In some aspects, the spring 58 may have a polymer coating 66 (see FIGS. 7A, 7B, and 7C) including, for example, a thermoplastic, a thermoset, a natural rubber, a synthetic rubber, a polysiloxane, or a combination thereof. The spring 58 may be coupled to the first end cap 14 and the second end cap 18 while the collapsible member 22 may be positioned inside the area formed by the spring 58 coil. In some aspects, the collapsible member 22 may be designed to incorporate the spring 58 so that the collapsible member 22 and spring 58 form a single piece that can be coupled between the first and second end caps 14, 18. The game call 10 as presented in FIG. 6 is in the open or extended position 34 so that the collapsible member 22 and spring 58 are in a partially or fully extended position. The clip member 26 is coupled to the first end cap 14 while the grip member 30 is coupled to the second end cap 18. Both the first and second end caps 14, 18 include the rim portion 32 that runs along the perimeter of the first and second end caps 14, 18 to form an additional side around the edge. A user attempting to simulate a rustling foliage sound may extend and retract the collapsible member 22 and spring 58 as many times as desired to continue making the respective sound.

The addition of the spring 58 may provide several benefits to the game call 10. For example, the spring 58 can assist in holding the first and second end caps 14, 18 together when the game call is in the closed position 38 (see FIG. 5). Additionally, the spring 58 can improve the production of the rustling foliage sound by increasing the rubbing or contact of the collapsible member 22 with itself when the collapsible member 22 is extended and retracted. The spring 58 may also be used to produce a hoof or hoof stomping noise when the first and second end caps 14, 18 are contacted together upon release of the end caps 14, 18 when the game call 10 is in the open or extended position 34.

Figure 7C:
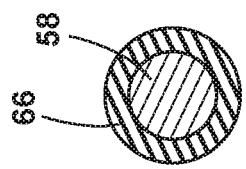
FIG. 7C is a cross-sectional view of a spring having a rubber coating according to some aspects of the present disclosure.
Figure 7B:
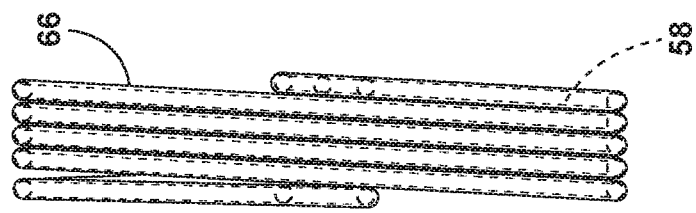
FIG. 7B is a side view of a spring provided in FIG. 7A according to some aspects of the present disclosure.
Figure 7A:
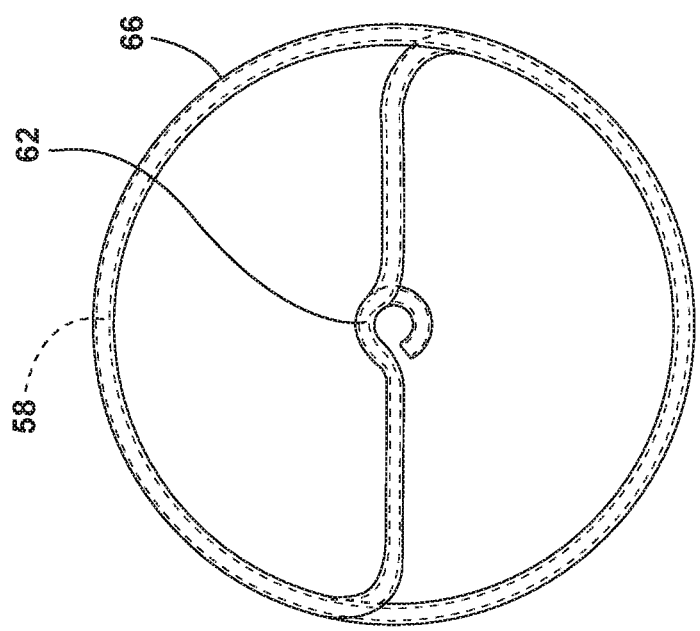
FIG. 7A is a front view of a spring used in the game call according to some aspects of the present disclosure.

Referring now to FIGS. 7A, 7B, and 7C, the spring 58 having the polymer coating 66, according to some aspects of the present disclosure, is provided. The spring 58 may be any type of spring known to one skilled in the art and may include a coil spring. In some aspects, the spring 58 may have an inner diameter (inside edge of a coil to inside edge of a coil) of about 3.50 inches. In some aspects, the spring 58 may also have a wire diameter of about 0.090 inches. In some aspects, the spring 58 may have 2, 3, 4, 5, 6, 7, 8, 9, or more complete coils included in the coil spring or any partial coil therebetween. The spring 58 may include one or more spring ends 62 that can be used to couple the spring 58 to the first and second end caps 14, 18. In some aspects, the spring end 62 may include a loop, a hook, a nub, an arm, or any other attachment member known to one skilled in the art.

Referring now to FIGS. 8 and 9, a front and rear perspective view of the game call 10 is provided according to some aspects of the present disclosure. The game call 10 includes the first end cap 14, the second end cap 18, and the collapsible member 22. The collapsible member 22 is positioned inside a coil of the spring 58 coated in rubber to help minimize the spring noise when the user is using the game call 10. Both the collapsible member 22 and the spring 58 may be coupled to the first end cap 14 and the second end cap 18 wherein the collapsible member 22 can be extended and retracted to simulate a rustling foliage sound. In some aspects, the game call 10 may additionally include the clip member 26 coupled to the first end cap 14 wherein the clip member 26 can be configured to simulate a branch breaking sound. The clip member 26 may be configured to snap against the insert member 48 where the insert member 48 may be made from a wooden material including, for example, white pine, pine, cedar, oak, poplar, maple, mahogany, cherry, or a combination thereof. In some aspects, the insert member 48 may be coupled to the first end cap 14 using glue, welds, molding, or snapping fixtures to position the insert member 48. In some aspects, the game call 10 may include one or more knob members 28 coupled to the first end cap 14 and/or the second end cap 18 where the one or more knob members 28 may be configured to be scraped against a surface (e.g., tree or log) to simulate an antler rubbing sound.

Figure 10:
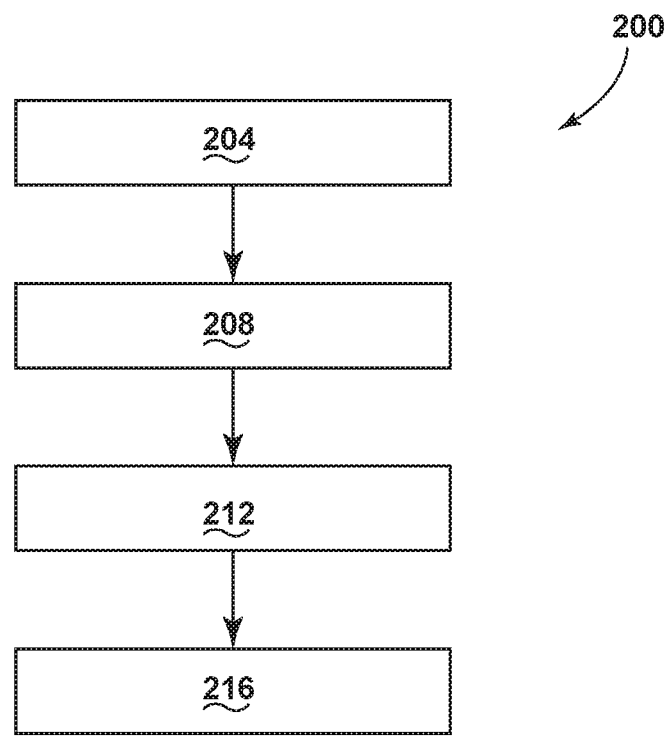
FIG. 10 is a flow diagram of a method for calling game according to some aspects of the present disclosure.

Referring now to FIG. 10, a method 200 for calling game is provided using the game call 10 provided in FIGS. 1-9 as previously shown and described. The method 200 may begin with a step 204 that includes providing the game call 10 having the first end cap 14, the second end cap 18, and the collapsible member 22 coupled to the first end cap 14 and the second end cap 18, the clip member 26 coupled to the first end cap 14, and one or more knob members 28 coupled to the first end cap 14 and/or the second end cap 18. In some aspects, the game call 10 may include a grip member 30 having the collapsible handle that can retract to a flat position with the second end cap 18.

Next, step 208 includes calling the game by simulating a rustling foliage sound using the game call 10. Step 208 may be achieved by extending and retracting the collapsible member 22 to simulate the thrashing/rustling foliage sound. The thrashing and/or rustling foliage sound is meant to replicate the sound of leaves, a tree, a branch, a sapling, a bush, undergrowth, or a combination thereof being shaken or brushed against. The user may vary the speed and forcefulness of retracting and extending the collapsible member 22 to change the intensity and/or volume of the thrashing and/or rustling foliage sound as desired by the user. In some aspects, when the user contacts the first and second end caps 14, 18 together when retracting the collapsible member 22, a hoof striking sound may be simulated. In some aspects, the game call 10 may be a multifunctional call wherein the thrashing and/or rustling foliage sound may be simulated with the extending and retracting of the collapsible member 22 and the hoof striking sound may be additionally simulated with the first and second end caps 14, 18 hitting each other.

Next, step 212 includes calling the game by simulating a branch breaking sound using the game call 10. Step 212 may be achieved by grasping and pulling the clip member 26 along the lip portion 26*d* to rotate the clip member 26 along a pivot point to snap the snapping flap 26*f* against the insert member 48. The snapping sound is meant to replicate the sound of breaking branches, twigs, sticks, and the like. In some aspects, the game call may be used to simulate a combination of calls/sounds including a thrashing/rustling foliage sound and a branch breaking sound.

Next, step 216 includes calling the game by simulating an antler rubbing sound using the game call 10. Step 216 may be achieved by rubbing the one or more knob members 28 against a tree or surface to simulate an antler rubbing sound. The antler rubbing sound is meant to replicate the sound of an antlered animal rubbing its antlers against, for example, a tree, a sapling, undergrowth, or a log. In some aspects, the game call may be used to simulate a combination of calls/sounds including a thrashing/rustling foliage sound, a branch breaking sound, and an antler rubbing sound. In other aspects, the game call may be used to simulate a combination of calls/sounds including a thrashing/rustling foliage sound and an antler rubbing sound. In still other aspects, the game call may be used to simulate a combination of calls/sounds including a branch breaking sound and an antler rubbing sound.

An additional step (not shown) may include opening and closing the attachment member 40 in order to activate the thrashing and/or rustling foliage sound or to lock the game call 10 closed so no sound can be produced and so the game call 10 cannot be caught on an unwanted surface to produced unwanted sound.

Another step (not shown) may include extending and retracting the grip member 30 so the user in the extended state can activate the collapsible member 22 to simulate the thrashing and/or rustling foliage sound or in the retracted state store or lock the game call 10.

It is understood that the description outlining and teaching the game call 10 previously discussed, which can be used in any combination, applies equally well to the method 200 for calling game.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A game call comprising:
   a first end cap;
   a second end cap;
   a collapsible member coupled to the first end cap and the second end cap wherein the collapsible member can be extended and retracted to simulate a rustling foliage sound;
   a clip member coupled to the first end cap wherein the clip member is configured to simulate a branch breaking sound; and
   one or more knob members coupled to the first end cap, the second end cap, or a combination thereof wherein the one or more knob members are configured to be scraped against a surface to simulate an antler rubbing sound.

2. The game call of claim 1, further comprising:
a spring having a polymer coating wherein the spring is coupled to the first end cap and the second end cap.

3. The game call of claim 1, wherein the collapsible member comprises a cloth cover and a noisy plastic interior.

4. The game call of claim 1, wherein the first and second end caps comprise a plastic material or a rubber material.

5. The game call of claim 1, wherein the clip member is configured to snap against a surface selected from a group consisting of a wooden insert, the first end cap, a plastic insert, a metal insert, a textured insert, or a combination thereof.

6. The game call of claim 1, wherein the collapsible member has an accordion design.

7. The game call of claim 1, further comprising:
a grip member coupled to the second end cap wherein the grip member is a collapsible handle that can retract to a flat position with the second end cap.

8. The game call of claim 1, further comprising:
an attachment member configured to lock the first end cap to the second end cap when the game call is not in use.

9. A game call comprising:
a first end cap;
a second end cap;
a clip member coupled to the first end cap wherein the clip member is configured to simulate a branch breaking sound; and
a collapsible member coupling the first end cap to the second end cap wherein the collapsible member can be extended and retracted to simulate a rustling foliage sound.

10. The game call of claim 9, further comprising:
one or more knob members coupled to the first end cap, the second end cap, or a combination thereof wherein the one or more knob members are configured to be scraped against a surface to simulate an antler rubbing sound.

11. The game call of claim 9, further comprising:
a spring having a polymer coating wherein the spring is coupled to the first end cap and the second end cap.

12. The game call of claim 9, wherein the collapsible member comprises a cloth cover and a noisy plastic interior.

13. The game call of claim 9, wherein the clip member is configured to engage a portion of the first end cap to simulate the branch breaking sound.

14. The game call of claim 13, wherein the first end cap includes an insert member that engages the clip member to simulate the branch breaking sound.

15. A game call comprising:
a first end cap;
a second end cap;
a collapsible member coupling the first end cap to the second end cap wherein the collapsible member can be extended and retracted to simulate a rustling foliage sound; and
a spring having a polymer coating wherein the spring is coupled to the first end cap and the second end cap.

16. The game call of claim 15, further comprising:
a clip member coupled to the first end cap wherein the clip member is configured to simulate a branch breaking sound.

17. The game call of claim 16, wherein the clip member is configured to engage a portion of the first end cap to simulate the branch breaking sound.

18. The game call of claim 15, further comprising:
one or more knob members coupled to the first end cap, the second end cap, or a combination thereof wherein the one or more knob members are configured to be scraped against a surface to simulate an antler rubbing sound.

19. The game call of claim 15, wherein the collapsible member comprises a cloth cover and a noisy plastic interior.

20. The game call of claim 15, wherein the collapsible member has an accordion design.

* * * * *